March 24, 1931.    J. GUDMAND-HÖYER    1,797,339
CANULE FOR COW TEATS
Filed Nov. 10, 1928
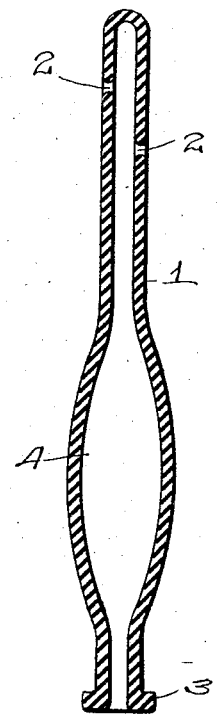
Inventor:
Johannes Gudmand-Höyer.

UNITED STATES PATENT OFFICE

JOHANNES GUDMAND-HÖYER, OF NYBOLLE, NEAR BALLERUP, DENMARK

CANULE FOR COW TEATS

Application filed November 10, 1928, Serial No. 318,468, and in Denmark December 10, 1927.

The present invention relates to a canule for the teats of cows, which has such a softness and flexibility that it will not injure the texture of the udder.

It is therefore easier to introduce it without great pain to the animal and is, later on, less troublesome in milking than a normal canule of stiff material as it can bend with the teat.

In the accompanying drawing a form of such a canule is shown by way of example. The drawing shows a longitudinal section through a cow teat canule. The numeral 1 indicates the canule itself, which is hollow and made of a soft flexible material, for example caoutchouc or the like. The canule is closed at the top and has at the upper end two or more holes 2, through which the milk can enter into the canule. The latter has below a collar 3 which shall prevent its being pushed too far up. Furthermore it has at a suitable distance from its lower end an enlargement 4 which serves to hold it in its position in the teat.

Before the canule shall be used, it is placed onto a somewhat stiff, suitably shaped rod on which it is then introduced into the udder. In order that this rod, at the top, should not be pushed through the canule, the holes 2 in the latter are preferably arranged at the sides of the same. After the canule has been introduced, the rod is withdrawn.

By such mode of introduction it is attained that the canule may be made, as aforesaid, of a very soft material.

A canule according to the present invention may be made of any other suitable form than here described. The enlargement 4 which serves to hold the canule in position may, for example, be made with grooves and the like for better offering resistance against its being shifted.

If the canule has two holes, as shown, these may be arranged, for example, diametrally to each other and at different levels, so as not to weaken the wall of the canule too much at the respective place, not more than necessary.

I claim:

Canule intended for insertion into the teats of cows, made of a soft, elastic material, having near its lower end an enlargement, adapted to be compressed and again expand during the milking thereby assisting the passage of the milk through the teat.

In testimony whereof I affix my signature.

JOHANNES GUDMAND-HÖYER.